April 28, 1936.  L. D. SOUBIER  2,038,808

GLASS GATHERING AND MOLDING APPARATUS

Filed Aug. 15, 1933  5 Sheets-Sheet 1

Inventor
Leonard D. Soubier
By
J. F. Rule, Attorney

April 28, 1936. L. D. SOUBIER 2,038,808
GLASS GATHERING AND MOLDING APPARATUS
Filed Aug. 15, 1933 5 Sheets-Sheet 4
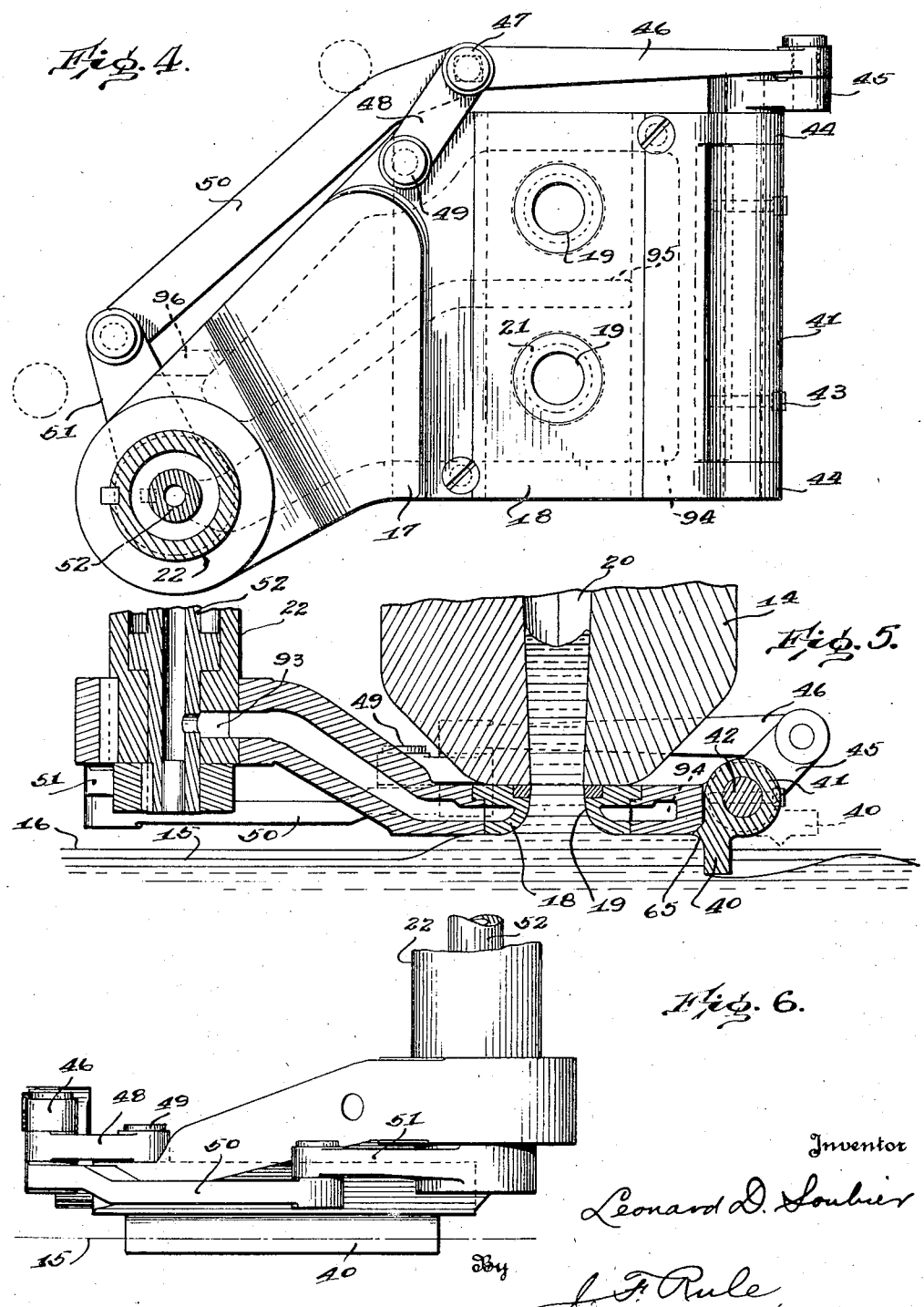

April 28, 1936. L. D. SOUBIER 2,038,808
GLASS GATHERING AND MOLDING APPARATUS
Filed Aug. 15, 1933 5 Sheets-Sheet 5
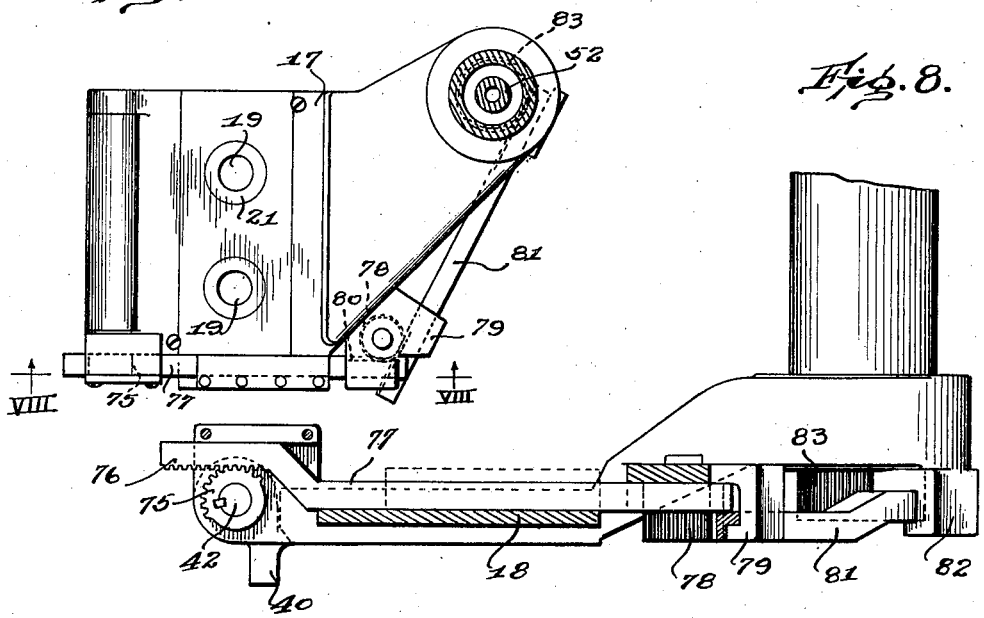
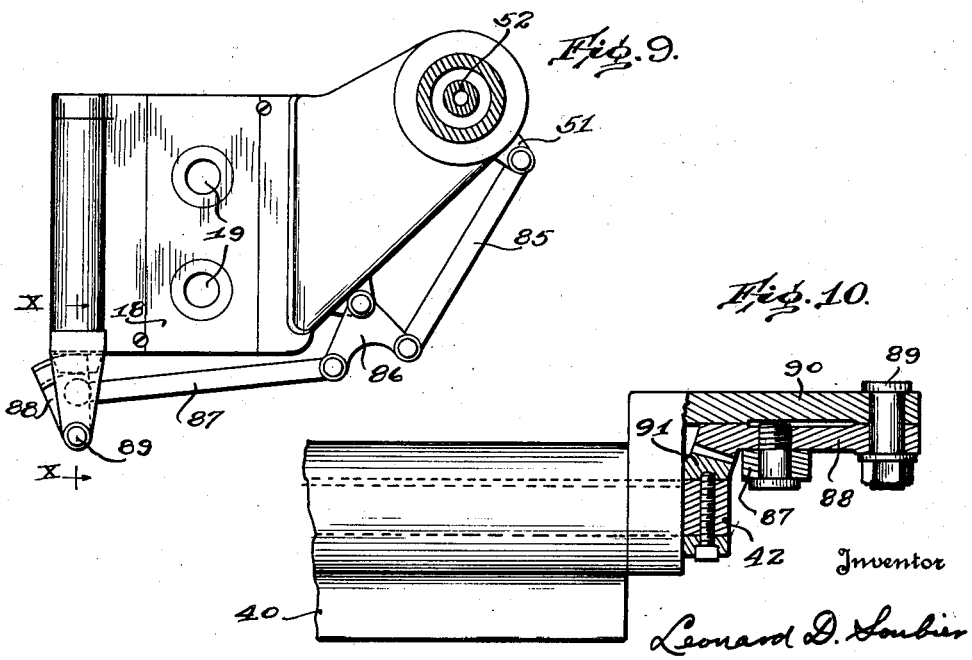

Patented Apr. 28, 1936

2,038,808

UNITED STATES PATENT OFFICE 2,038,808

GLASS GATHERING AND MOLDING APPARATUS

Leonard D. Soubier, Toledo, Ohio, assignor to Owens-Illinois Glass Company, a corporation of Ohio Application August 15, 1933, Serial No. 685,265

9 Claims. (Cl. 49—5)

My invention relates to machines for molding glass articles, of the type in which the molds are caused to travel horizontally and are periodically brought to a charging position over a pool of molten glass, the glass being introduced by suction into the molds as they travel over the pool. In machines of this type, the molds when brought over the pool or supply body of glass are usually lowered so that the lower open ends dip into and plow through the glass while they are vacuumized to cause the glass to enter and fill the mold cavities.

In machines of the type indicated, the molds are ordinarily mounted on a horizontally rotating mold carriage, and with modern machines of large size and output the carriages rotate at a rather high speed so that the molds move rapidly along the surface of the glass while receiving their charges. This movement of the molds relative to the glass sometimes interferes with the mold charging operation. It tends to prevent a perfect seal between the pool of glass and the mouth of the mold through which the glass enters, thereby permitting air to be drawn in with the glass so that the mold is not completely filled. Also, owing to the viscous nature of the glass, there is a strong drag or backward pull on the glass entering the mold, which impedes the filling operation and interferes with the formation of the parison within the mold.

An object of the present invention is to provide a novel and practical means for overcoming these difficulties.

A further objection characteristic to machines of the type above indicated relates to the excessive heating of the lower end of the mold owing to its contact with the pool of molten glass during the charging operation. This results in the molds burning and wearing away quite rapidly. This rapid wear is augmented by the action of the usual cut-off knife which swings across the bottom of the mold after each charging operation. An object of the present invention is to overcome this difficulty by the provision of novel means which obviates the necessity of lowering the mold to the level of the supply body or pool. Such means also makes it possible to move the molds continuously in a horizontal plane above the level of the rim of the gathering pot or tank, so that the usual mechanism for lowering the mold into dip and then lifting it to clear the tank may be dispensed with.

Another object of my invention is to provide in combination with a blank mold or other receptacle which is caused to travel horizontally over a pool of molten glass and receive the measured charge of glass by suction, a guiding device traveling with the mold for guiding the charge of glass into the mold, said guiding device being interposed between the mold and the pool of glass but spaced above the level of the pool, in combination with a plow or the like also traveling with the mold for lifting a portion of the glass in the pool into engagement with said guiding device and maintaining a localized supply of glass from which the charge of glass is drawn into the mold.

In the Owens type of suction gathering machine to which the present invention as herein illustrated is adapted, the charge of glass in the mold is severed by means of a knife carried by a horizontally swinging arm on a vertical rock shaft. A feature of the present invention relates to the mounting of the mold plow on the knife arm so that it swings with the knife arm to and from an operating position and is lifted and lowered with said arm.

A further object of the invention is to provide in combination with a blank mold or other receptacle which is caused to travel horizontally over a pool of molten glass but spaced above the surface level of the pool, a cutter operating between the receptacle and the pool for severing the charge, and means carried by the cutter for lifting a portion of the glass in the pool into position to seal the mouth of the receptacle and permit a charge of glass to be drawn into the receptacle by suction.

Other objects of the invention will appear hereinafter.

In Patent No. 1,967,377, granted July 24, 1934, Suction type glass gathering and forming machines, I have shown and claimed a mold plow cooperating with a suction gathering mold and operative to lift the glass up to the mold during the charging operation while the mold travels in a plane above the surface level of the supply body. The present application discloses certain features disclosed and claimed in said patent.

Referring to the accompanying drawings:

Fig. 4 is a sectional plan view showing the cutter arm with the plow mounted thereon.

Fig. 5 is a sectional elevation of the same, showing the relation of parts during the suction gathering operation.

Fig. 6 is a side elevation of mechanism shown in Figs. 4 and 5.

Fig. 7 is a plan view similar to Fig. 4, but showing a modified form of mechanism for swinging the plow on the knife arm.

Fig. 8 is a sectional elevation at the line VIII—VIII on Fig. 7.

Fig. 9 is a sectional plan view similar to Fig. 7, but showing a further modification of the plow operating mechanism.

Fig. 10 is a part sectional elevation of the same, the section being taken at the line X—X on Fig. 9.

Figure 1:
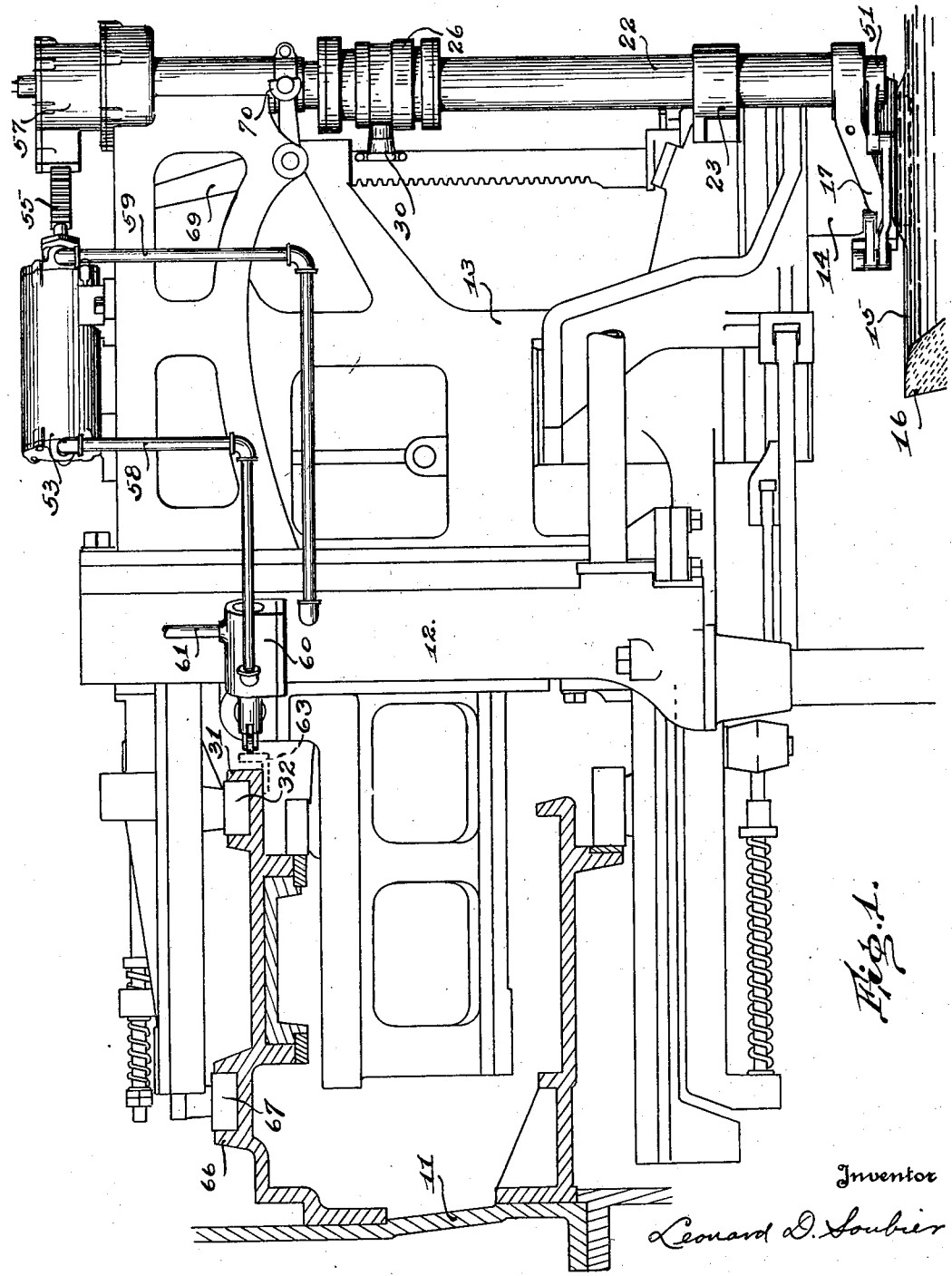
Fig. 1 is a part sectional elevation of one head or unit of an Owens type suction gathering machine to which the present invention is applied.
Figure 2:
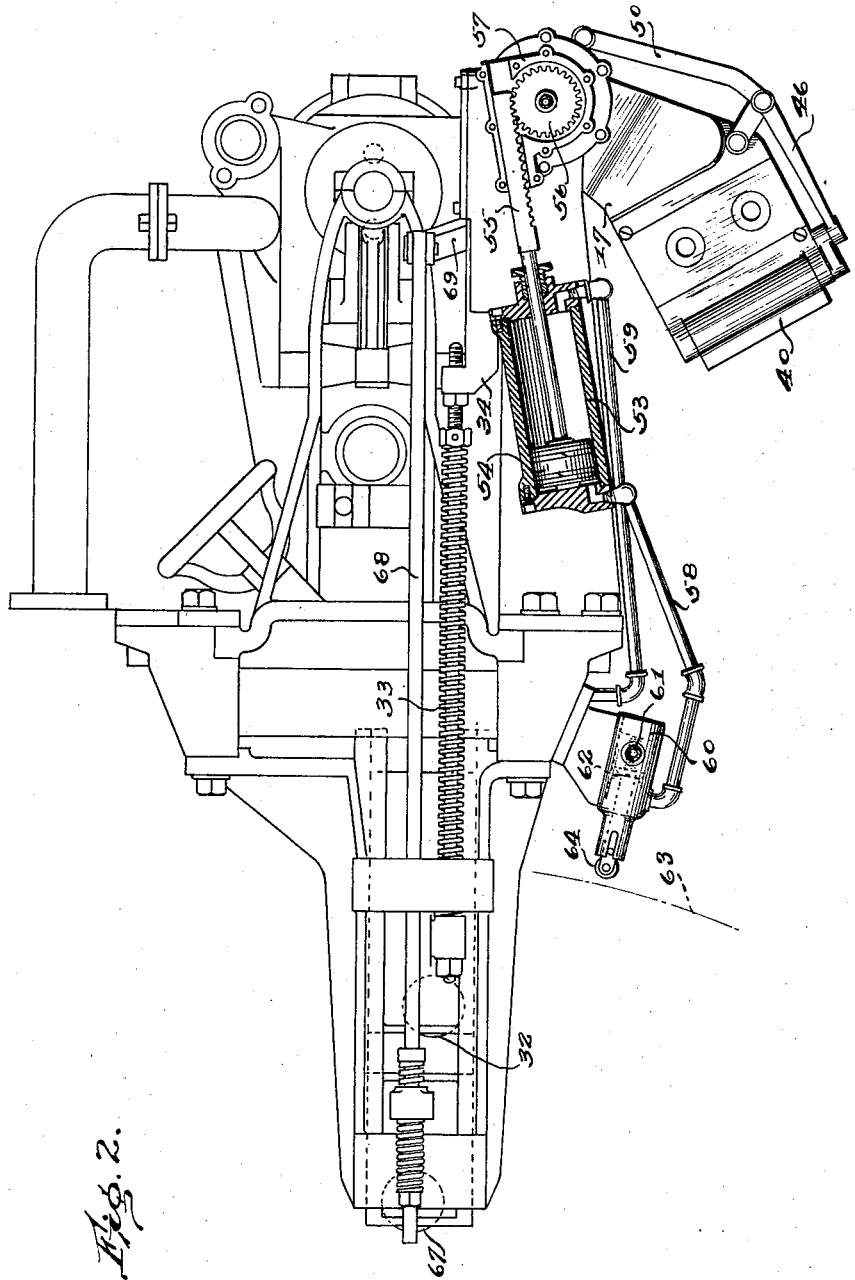
Fig. 2 is a part sectional plan view of the same.
Figure 3:
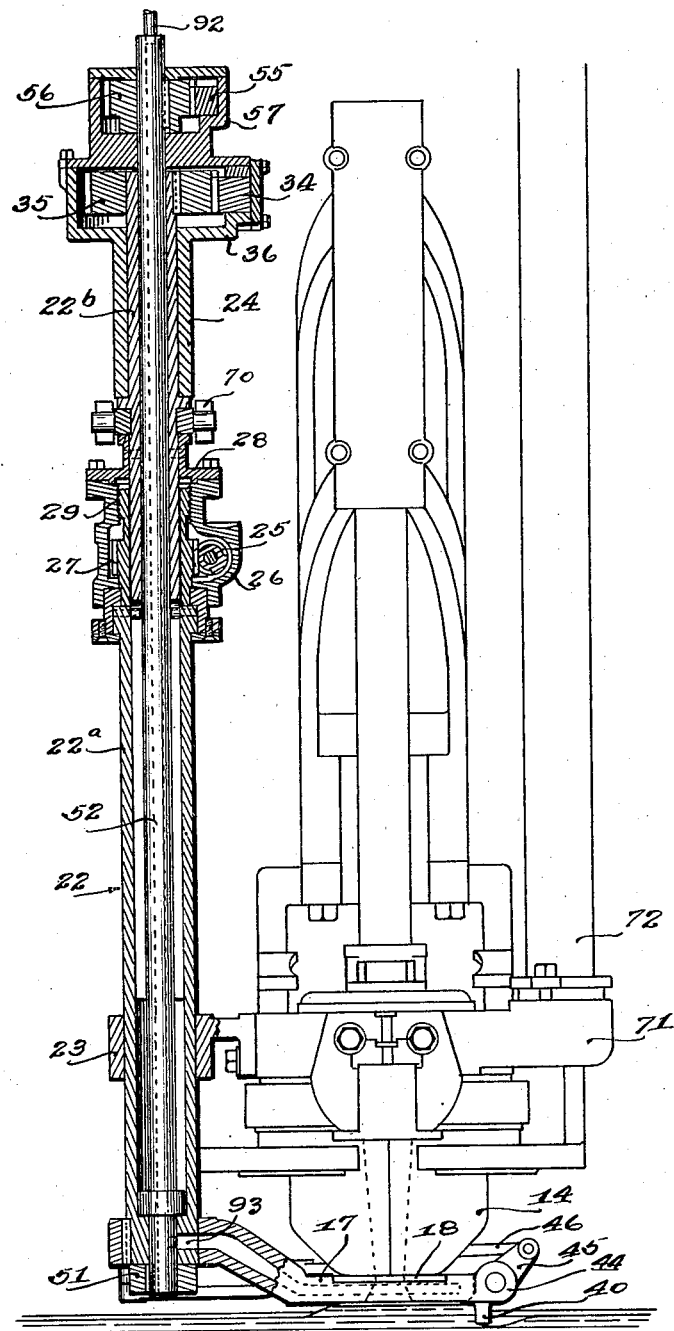
Fig. 3 is a part sectional front elevation of mechanism shown in Figs. 1 and 2.

Referring particularly to Figs. 1, 2, and 3, I have illustrated a standard Owens type suction machine with such modifications as required to embody the present invention. This machine comprises a stationary center column 11 on which a mold carriage 12 is mounted for continuous rotation about the vertical axis of the machine. An annular series of heads or units is mounted on the carriage, each head or unit 13 carrying a mold group which includes a suction gathering blank mold 14. Each mold 14 as it rotates with the carriage is brought periodically to a charge gathering position over a pool 15 of molten glass within the container 16. This container may be either a rotating tank or a stationary pot or trough to which molten glass is continuously supplied from the melting tank.

Mechanism for severing the glass in the mold from the supply body comprises a horizontally swinging knife arm 17 on which is mounted a knife or cutter plate 18. As here shown, the knife plate is provided with openings or passageways 19 extending therethrough, adapted to register with the mold cavities 20 (Fig. 5) when the knife is swung to operative position beneath the mold, as hereinafter set forth. Rings 21 of hardened steel or other suitable material are seated in recesses in the upper face of the knife plate 18 so as to form the upper portion of the passageways 19. The upper surfaces of said rings are flush with the knife plate and their inner edges cooperate with the lower edges of the mold cavity for severing the glass when the knife shears across the mold.

The knife arm 17 is keyed to the lower end of a vertical rock shaft 22 mounted to rock in bearings 23 and 24 on the head 13. The knife shaft 22 comprises a lower tubular section $22^a$ and an upper tubular section $22^b$. Means for rotatively adjusting the lower section relative to the upper section comprises a worm wheel 25 mounted in a casing 26 and meshing with a worm gear 27 on the lower shaft section $22^a$. The head plate 28 of the gear casing 26 is keyed to the upper shaft section $22^b$. The upper end of the lower shaft section has a screw threaded connection 29 with the gear case 26. The worm 25 is operated by a hand wheel 30 (Fig. 1). It will be apparent that by means of the construction just described, rotation of the hand wheel 30 will rotate the lower shaft section $22^a$ relative to the upper section $22^b$.

The shaft 22 is periodically rocked to swing the knife plate to and from its operative position beneath the mold. The mechanism as shown for rocking the shaft is conventional with Owens type machines. It comprises a stationary cam 31 (Fig. 1) on which runs a cam roll 32 having a connection 33 (Fig. 2) with a rack bar 34 which, as shown in Fig. 3, drives a pinion 35 splined on or keyed to the rock shaft 22. The rack 34 is guided in a gear case 36 formed integral with the bearing sleeve 24.

The plow 40 by which glass is lifted and held in sealing contact with the knife plate 18 during the gathering operation will now be described. The plow, as shown, comprises a horizontal blade formed integral with a sleeve 41 mounted on a rock shaft 42 to which it is secured by keys 43. The shaft 42 is journaled in bearing lugs 44 on the outer end of the knife arm 17. A rock arm 45 keyed to the rock shaft 42, is connected through a link 46 to a pivot 47 at the outer end of a link 48, the inner end of which is pivoted at 49 to the knife arm 17. An arm or link 50 is connected at one end to the pivot 47 and at its opposite end to a rock arm 51 keyed to a vertical rock shaft 52 which extends through the hollow shaft 22.

The shaft 52 is periodically rocked by means of a piston motor 53 (Figs. 1 and 2) comprising a cylinder mounted on the head 13, and a piston 54. A rack bar 55 on the outer end of the piston rod operates a pinion 56 within a housing 57, said pinion being splined on the upper end of the plow operating shaft 52.

The motor 53 is operated by air under pressure supplied thereto through pipes 58 and 59 opening into the motor cylinder at the opposite ends thereof. The pipe 59 may be connected directly to a source of air pressure supply. The pipe 58 extends to a valve box 60 to which air under pressure is supplied through a pipe 61. A valve 62 in the valve box is actuated periodically by means of a stationary cam 63 which engages a cam roll 64 on the valve stem. When the valve is closed, the motor piston is retracted to the Fig. 2 position. When the cam 63 operates to open the valve 62, air pressure is admitted through the pipe 58 to the inner end of the motor cylinder and thereby moves the motor piston outwardly, causing it to operate through the rack 55 and pinion 56 to rock the shaft 52 which in turn operates through the links 50 and 46 to rock the shaft 42 and thereby swing the plow 40 from a horizontal position (Fig. 2) to the vertical position shown in full lines on Fig. 5. It will be noted that the end of the knife arm provides an abutment for the plow, thereby limiting its swinging movement. The plow when in its operative position forms in effect a vertical downward extension of the knife arm 17. The inner face of the plow, as shown in Fig. 5, may comprise a curved portion 65 merging into the under surface of the knife arm.

The rock shaft 22 and the parts carried thereby are moved up and down periodically for lifting the knife plate so that it can clear the rim of the tank 16 and then lowering it so that it can swing to operative position beneath the mold. The mechanism for lifting and lowering the rock shaft 22 may be of the usual construction found in Owens type machines and comprises a stationary cam 66 on which runs a cam roll 67 (Fig. 2) having an operating connection, including a link 68, with one arm of a bell crank 69, the other arm of which comprises a yoke 70 connected to the shaft section $22^b$.

In order to prevent excessive heating of the knife arm 17, provision is made for circulating air or other cooling medium therethrough. For this purpose air under pressure is supplied through a pipe 92 (Fig. 3) to the upper end of the hollow shaft 52. The air line continues from the lower end of the shaft (see Fig. 5) through a passageway 93 into a chamber 94 in the knife arm. A partition 95 in said chamber directs the flow of air which after circulating through the knife arm, is exhausted through a port 96 (Fig. 4) adjacent the rock shaft.

The operation may be summarized as follows: As the mold carriage rotates, the mold 14 is periodically brought to a charge gathering area over a pool of glass in the tank 16. While the mold is approaching the gathering area, the knife arm 17 is in its retracted position at one side of the mold, as shown in Fig. 2. After the knife arm passes the rim of the tank, the cam 66 (Fig. 1) operates to lower the knife shaft 22 and knife arm, bringing the upper surface of the knife blade into or below the plane of the bottom end of the mold. The knife arm is then swung inward to operative position (Fig. 5) in which the openings 19 register with the mold cavities. This swinging movement of the knife arm is effected by the cam 31 operating through the connections heretofore described. If the knife is spaced below the mold during this swinging movement, it is lifted to the mold when in position therebeneath. As the knife arm is brought to operative position, the plow 40 is swung downward from the dotted line to the full line position (Fig. 5), such movement being effected by the operation of the motor 53 under the control of the valve 62 (Fig. 2) actuated by the cam 63.

As the plow 40 when in its operative position extends downward into the pool of glass, its rapid forward movement through the glass causes a portion of the glass in front of the plow to be piled up or raised into contact with the lower surface of the knife plate, thereby sealing the openings 19. Suction is now applied to the mold cavities in the usual manner by exhausting the air through a suction head 71 (Fig. 3) and suction pipe 72 so that glass is drawn upward through the openings 19 and fills the mold cavities. The plow 40 serves not only to lift and maintain a supply of glass in sealing contact with the passageways 19 but also causes this raised glass to be carried along with the cutter plate and mold. The glass which is being drawn into the mold is thus in effect drawn from a supply body which is advancing with and at substantially the same speed as the mold. This permits perfect sealing contact between the glass and the cutter plate at the passageways 19 so that no air can be drawn through said passageways into the mold. Moreover, as this local supply body of glass advances with the mold there is no downward pull on the glass in the mold cavity such as is ordinarily produced by the forward movement of the mold relative to the pool of glass. When the mold cavity has been filled, the knife shaft 22 is rocked to swing the knife plate laterally, causing the cutter rings 21 to sever the glass. During or following the cutting operation, the plow 40 is swung upward to its horizontal position, allowing the severed glass below the mold to settle back into the pool. When the knife arm has been swung to a position to clear the mold, it is raised to clear the rim of the pot 16. If desired, the up and down movements of the knife plate may be eliminated, the knife plate being permanently maintained at a level to clear the rim of the pot and the plow 40 being constructed to lift the glass to the cutter plate.

Figs. 7 and 8 illustrate a modified construction for transmitting motion from the shaft 52 to the plow. As here shown, a segmental gear 75 is secured to the shaft 42 and engages rack teeth 76 on a rack bar 77. A gear 78 journaled in a bracket 79 on the knife arm 17 engages rack teeth 80 on the bar 77. A rack bar 81 having bearings in the bracket 79 and a bracket 82, has rack teeth adjacent its opposite ends engaging, respectively, the gear 78 and a gear 83, the latter keyed to the lower end of the rock shaft 52.

Figs. 9 and 10 show another modification of the means for transmitting motion from the shaft 52 to the plow. In this instance the rock arm 51 on the shaft 52 is connected through a link 85 to one arm of a bell crank 86 pivoted on the knife arm, the other arm of the bell crank being connected through a link 87 to a gear segment 88. The latter is mounted by means of a pivot pin 89 on a bracket 90 on the knife arm. The gear segment 88 drives a gear segment 91 keyed to the shaft 42. Oscillation of the shaft 52 operates through the connections just described to rock the shaft 42 and thereby swing the plow 40 to and from its operative position.

Modifications other than those herein described may be resorted to within the spirit and scope of my invention.

What I claim is:

1. The combination of a measuring receptacle open at its lower end, means for causing the receptacle to travel horizontally over a pool of molten glass with said open end spaced above the glass, a cutter device traveling with the receptacle and movable into and out of a position in which it is interposed between the receptacle and the pool, a plow carried by said cutter device and extending downward into the pool of glass when said cutter device is beneath the receptacle, and automatic means for periodically lifting and lowering the plow relative to said cutter device.

2. The combination of a mold open at its lower end to receive a charge of glass by suction, means for causing the mold to travel horizontally over a pool of molten glass with said opening spaced above the level of the pool, a cutter, means for swinging the cutter across the bottom end of the mold for severing the charge, a plow carried by said cutter and arranged to extend downward into the pool of glass, and automatic means operating periodically and in tuned relation to the swinging movements of the cutter for moving the plow upward relative to the cutter to an inoperative position.

3. The combination of a receptacle open at its lower end to receive a charge of glass, means for causing said receptacle to travel horizontally over a pool of molten glass with said end spaced above the surface level of the pool, a glass guiding and severing device traveling with the receptacle and having an opening therethrough providing a passageway through which glass enters the mold, automatic means for moving said device periodically into and out of a position beneath said receptacle with said opening in register with the open end of the receptacle, a plow carried by said device and projecting downward therefrom into the pool, and automatic means for periodically moving said plow up and down on said device in synchronism with said periodic movements of said device.

4. The combination of a measuring receptacle open at its lower end, means for causing said receptacle to travel horizontally over and spaced above a pool of molten glass, a vertically disposed rock shaft arranged beside the measuring receptacle, an arm carried thereby, a plow mounted on said arm, means for rocking said shaft, and means for swinging the plow relative to said arm, into position to dip into the glass in the pool and raise a portion of the glass above the surface level of said pool.

5. The combination of a measuring receptacle open at its lower end, means for causing said receptacle to travel horizontally over and spaced above a pool of molten glass, a vertically disposed rock shaft, an arm carried thereby, a plow mounted on said arm, and automatic means for periodically moving the plow up and down on said arm in synchronism with the movements of receptacle over said pool.

6. The combination of a mold, a rock shaft, a rock arm on said shaft, a cutter on said arm, a plow carried by said arm, a second rock shaft concentric with said first mentioned shaft and rotatable relative thereto, means for separately rocking said shafts, and means operated by the rocking of said second shaft to move the plow up and down on said arm.

7. A machine for molding glass articles comprising a traveling mold carriage, a mold thereon open at its lower end to receive a charge of glass, a vertically disposed rock shaft traveling with the mold, a rock arm on said shaft, a plow carried by said arm, means for rocking said shaft and thereby swinging said arm laterally toward and from the mold, and means for lifting and lowering the plow relative to said arm.

8. A machine for molding glass articles comprising a mold carriage rotatable about a vertical axis, a suction gathering mold mounted on the carriage and open at its lower end to receive a charge of molten glass, a vertically disposed rock shaft mounted on the carriage, an arm carried by the rock shaft, a cutter on said arm, means for rocking said shaft and causing the cutter to shear across the bottom of the mold for severing a charge, a plow mounted on said arm, and means for moving the plow up and down relative to the arm.

9. A machine for molding glass articles comprising a mold carriage rotatable about a vertical axis, a suction gathering mold mounted on the carriage and open at its lower end to receive a charge of molten glass, a vertically disposed rock shaft mounted on the carriage, an arm carried by the rock shaft, a cutter on said arm, means for rocking said shaft and causing the cutter to shear across the bottom of the mold for severing a charge, a plow mounted on said arm for movement up and down relative thereto, a second rock shaft concentric with said first mentioned shaft, means for rocking said second shaft, and operating connections between the plow and said second shaft for moving the plow up and down when said second shaft is rocked.

LEONARD D. SOUBIER.